United States Patent
Van Lerberghe

(12) 
(10) Patent No.: US 6,173,089 B1
(45) Date of Patent: Jan. 9, 2001

(54) IMAGE HANDLING SYSTEM AND METHOD

(75) Inventor: Steven J. W. Van Lerberghe, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/048,878

(22) Filed: Mar. 26, 1998

(30) Foreign Application Priority Data

Apr. 2, 1997 (EP) .................................................. 97400762

(51) Int. Cl.$^7$ ....................................................... G06K 9/32
(52) U.S. Cl. ........................................... 382/299; 382/302
(58) Field of Search ................................... 382/299, 302, 382/277, 298; 358/426

(56) References Cited

U.S. PATENT DOCUMENTS

| | | | |
|---|---|---|---|
| 4,751,742 | * | 6/1988 | Meeker .................................. 382/41 |
| 4,873,577 | * | 10/1989 | Chamzas .............................. 358/426 |
| 5,396,237 | | 3/1995 | Ohta ....................................... 341/50 |
| 5,590,261 | * | 12/1996 | Sclarroff et al. ..................... 395/173 |

FOREIGN PATENT DOCUMENTS

WO/9514349  5/1995  (WO) .

* cited by examiner

Primary Examiner—Bhavesh Mehta
Assistant Examiner—Kanji Patel
(74) Attorney, Agent, or Firm—Jack D. Slobod

(57) ABSTRACT

An image is grouped the image into levels of blocks of pixels, each particular level, except a top level, providing a subdivision of each block of pixels of a next higher level into a respective matrix of blocks of pixels of that particular level. An image source transfers pixel values of all of the pixels to an image receiver like a display device on a block by block basis. The blocks in each respective matrix are transferred consecutively without intervening transfer of pixel values of pixels from other blocks from the same level. This makes it possible to make interchangeable use of image receivers with mutually different resolutions, without requiring a change in the way the pixel values are transferred and without requiring a memory in the image receiver for pixel values that are transferred between the pixel values for one block.

6 Claims, 2 Drawing Sheets

IMAGE HANDLING SYSTEM AND METHOD

BACKGROUND OF THE INVENTION

1. Field of the Invention

The invention relates to an image handling system including an image source and an image receiver linked to each other for transfer of pixel values, the image source transferring about the pixels to the receiver on a clock of pixels after block of pixels basis. The invention also relates to a method of operating such a system.

2. Description of the Related Art

Such an image handling system and method is known from PCT patent application WO 95/14349.

Conventionally the pixel values of pixels of an image are transferred line of pixels after line of pixels from an image source like a tuner to an image receiver like a display device.

Resolution of the image receiver is a cost factor. For example, a low resolution display device which displays one output pixel for each block of pixels in the image is usually less expensive than a higher resolution display device which displays an output pixel for each pixel in the image. It is therefore desirable to introduce different versions of the image handling system, which differ from each other in the resolution used by the image receiver. However, in order to obtain the lower resolution the pixel values of the pixels from each block need to be compounded. In principle this could be done in the image source, but to simplify the exchange of different image receivers and to keep down development cost, it is desirable to keep the image source the same for each version of the image handling system. In this way only one image source needs to be developed for several image receivers and the development cost of the image receivers could be spread over different types of image sources.

However, when the pixel values are transferred for line of pixels after line of pixels one or more line memories are needed in the image receiver to store pixel values that are transferred between the pixel values of pixels of one block for later compounding. This causes extra cost, thereby defeating the purpose of using different image receivers.

What is needed is a method of allowing interchangeable use of image receivers with mutually different resolutions in the image handling system, without requiring a change in the way the pixel values are transferred and without requiring a memory in the image receiver for pixel values of pixels that do not belong to a block and that are transferred between the pixel values for that block.

WO 95/14349 teaches a system in which an image is compressed for transfer between the image source and the image receiver. The image source represents the image in a Quadtree structure, which subdivides the image into a matrix of two times two blocks, each block in turn being subdivided into a matrix of two times two smaller blocks and so on recursively. When the content of the image is such that there is less than a predetermined amount of variation in a block, the smaller blocks contained in that block are pruned from the representation of the image. The image source transfers image details only for those blocks that have not been pruned to the image receiver. In addition the image source transfers a quadtree code to indicate which blocks have been pruned. Information about the pixels is transferred block after block, all of the unpruned smaller blocks contained in each particular block in a matrix being transferred before transferring information about any other block in that matrix.

This publication is concerned with compression of images by eliminating transfer of whole blocks depending on the image content. It gives no suggestion to order the transfer of pixel values in this way if no elimination of blocks is attempted.

SUMMARY OF THE INVENTION

The image transfer system according to the invention is characterized in that, independent of a content of the image, the image source transfers the pixel values of all pixels of each particular block consecutively without intervening transfer of pixel values of pixels from other blocks from the level to which the particular block belongs. Thus all of the pixel values of the image are transferred, irrespective of the content of the image, in a temporal order which groups the pixel values of pixels contained in a block consecutively, the pixel values of pixels from different blocks of the same level being transferred block after block. Thus blocks belonging to a matrix that is a subdivision of a block at a next higher level are also transferred consecutively without intervening pixels from other blocks of the next higher level.

The image receiver has a resolution which corresponds to any predetermined level of blocks. For each block of that predetermined level the pixel values arrive without intervening pixel values from other blocks of that predetermined level. Therefore no memory is needed for such intervening pixel values. A family of versions of the system is possible with image receivers having a resolution corresponding to any of the levels of blocks, also to individual pixels.

An embodiment of the image handling receiver according to the invention is characterized in that the image receiver is arranged to retain the image at a coarser resolution than a resolution of individual pixels, the image receiver retaining only one respective output pixel for each particular block of a predetermined level, the image receiver deriving the one respective output pixel for the particular block from the transferred pixels of that particular block. In this case the invention is used to connect an image receiver with a coarser resolution than individual pixels.

Another embodiment of the image handling system according to the invention is characterized in that the image source is arranged to transfer the blocks from each respective matrix in a same sequence according to their spatial position in the matrix. This makes it possible to use the same type of address generation for assigning display coordinates at all levels of blocks.

BRIEF DESCRIPTION OF THE DRAWINGS

These and other advantageous aspects of the invention will be further described using the following drawing in which.

DETAILED DESCRIPTION OF THE PREFERRED EMBODIMENTS

Figure 1:
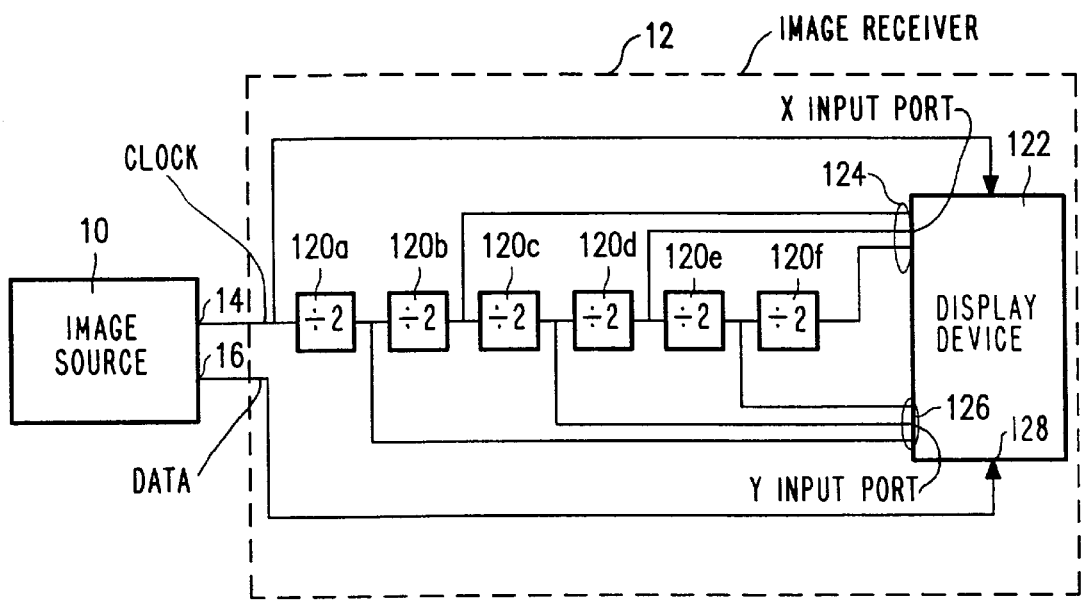
FIG. 1 shows an image transfer system according to the invention.

FIG. 1 shows an image transfer system containing an image source 10 and an image receiver 12. The image source 10 has a clock output 14 and a data output 16. The image receiver contains a cascade of divide-by-two circuits 120a–f (the cascade containing six circuits 120a–f in asynchronous cascade by way of example). The input of the cascade is coupled to the clock output 14 of the image source 10. The image receiver 12 furthermore contains a display device 122 with an X-address input port 124, a Y-address input port 126, a data input port 128 and a clock input. The clock output 14 is coupled to the clock input of the display device 122. Outputs of successive divide by two circuits 120a–f in the cascade are connected alternately to the X-address port 124 and the Y-address port 126. The data output 16 of the image source 10 is connected to the data input port 128. By way of example a matrix of 8×8 pixels is shown symbolically on the display device 122.

In operation, the image source 10 transfers pixel values to the image receiver 12 via the data output 16, clocked by the clock output 14.

Figure 2:
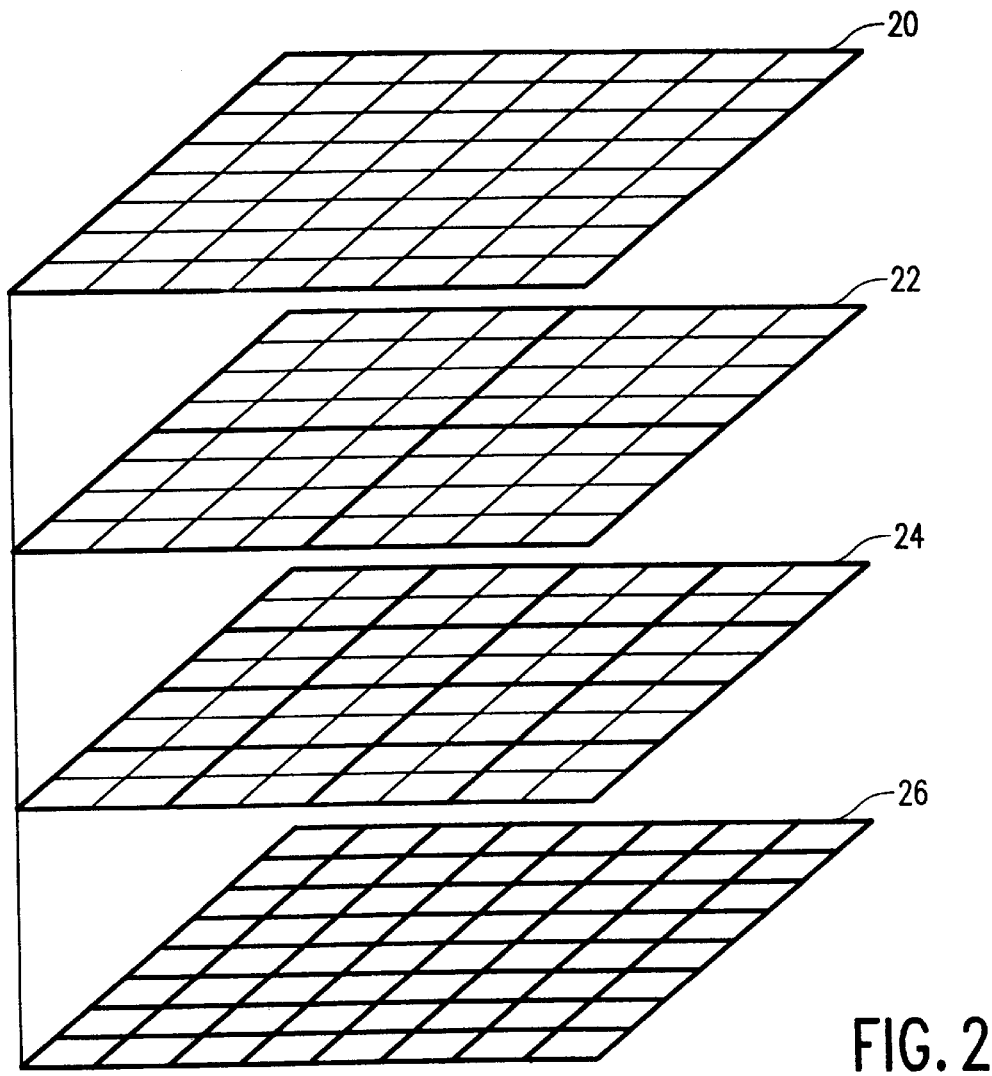
FIG. 2 shows a grouping of the pixels of an image into a number of levels of blocks.

FIG. 2 shows a grouping of the pixels of an image into a number of levels of blocks, to illustrate a sequence in which the image source 10 transfers pixel values to the image receiver 12. By way of example the image is shown to have 8×8 pixels. In a top level 20 of the grouping the image is subdivided into one block of 64 pixels, shown surrounded by thick lines. In a next lower level 22, the block of 64 pixels is divided into a 2×2 matrix of smaller blocks of 16 pixels each also shown surrounded by thick lines. In a next lower level 24 the smaller blocks of 16 pixels are each subdivided into 2×2 matrices of yet smaller blocks of 4 pixels each also shown surrounded by thick lines (i.e. the block of 64 pixels is subdivided into a 4×4 matrix of yet smaller blocks of 4 pixels each). Finally in the lowest level 26 the yet smaller blocks of 4 pixels each are subdivided into individual pixels.

Figure 3:
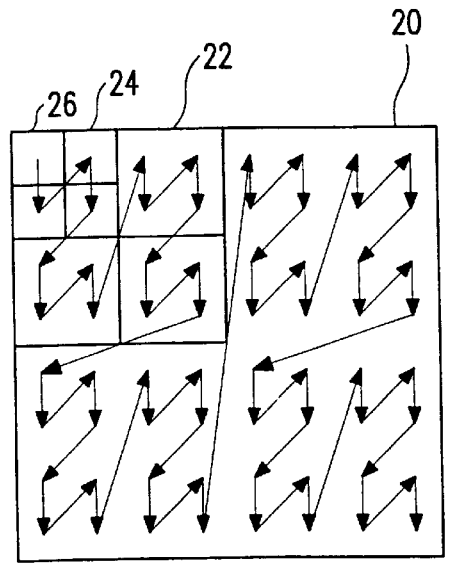
FIG. 3 shows a sequence of transferring pixel values according to the invention.

FIG. 3 shows a sequence of transferring pixel values according to the invention. In this sequence blocks of each level are transferred one after the other. At the level 22 of a 2×2 matrix of smaller blocks of 16 pixels each the pixel values of pixels in the upper left block of 16 pixels are transferred first, then the pixel values of the pixels in the lower left block of 16 pixels are transferred, then the pixel values of the pixels in the upper right block of 16 pixels and finally the pixel values of the pixels in the lower right block of 16 pixels. During the transfer of each block the smaller blocks of the next lower level are also transferred one after the other. For example, during the transfer of the upper left block of 16 pixels, the pixel values of the pixels in the upper left smaller block of 4 pixels of the lower level 24 are transferred first, then the pixel values of the pixels in the lower left block of 4 pixels within the upper left block of 16 pixels, then the pixel values of the pixels in the upper right block of 4 pixels within the upper left block of 16 pixels and finally the pixel values of the pixels in the lower right block of 4 pixels within the upper left block of 16 pixels.

Figure 4:
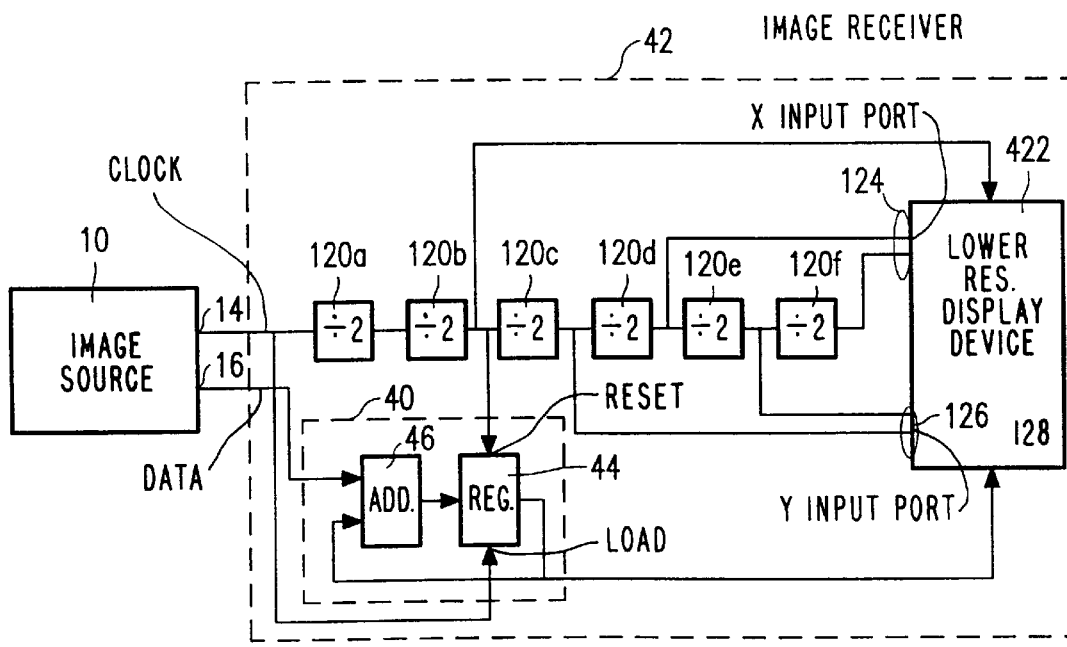
FIG. 4 shows a further image transfer system according to the invention.

Returning to FIG. 1, the image source 10 supplies the pixel values via data output 16 clocked with clock output 14 to the image receiver 12 in the sequence described in the context of FIGS. 3 and 4. The clock is applied to the cascade of divide-by-two circuits 120a–f, the divide-by-two circuits responding to 1-0 transitions (of course instead of the asynchronous an synchronous cascade may also be used, where transitions of all divide-by-two circuits are collectively clocked). The cascade of divide-by-two circuits 120a–f counts clock pulses received the clock output 14 and derives from this an X-Y address of the pixel. By using the outputs of the divide-by-two circuits 120a–f alternately for the X-address and the Y-address, a sequence of addresses ((X,Y)=(000,000), (000,001), (001,000), (001,001), (000, 010), (000,011), (001,010) etcetera) is generated that corresponds to the sequence in which the pixel values are transmitted. These addresses are used to signal to the display device 122 the X,Y coordinates of the pixel corresponding to the pixel value received from the data output 16 on the display surface of the display device 122. For every clock pulse on the clock output 14 a new pixel value and corresponding (X,Y) address is clocked in this way into the display device 122.

The image source 10 generates the sequence in which the pixel values are transferred for example using the same kind of divide-by-two cascade as the image receiver 122 for generating addresses of an image memory (not shown) or any other addressable pixel source. The precise implementation of generating the sequence is not essential. Of course, the specific link between the image source is also not essential. Instead of a data output and a clock output, one might use just a data-output and regenerate the clock from the data. The data may be transferred by transmission via any medium, such as wireless transmission, storage on magnetic tape etcetera or the image source and the image receiver may be part of a single apparatus, such as telephone handsets for image data communication which may be sold in different versions with display devices of different resolutions.

This sequence of transferring pixel values to the image receiver 12 does not have any particular advantage in the system of FIG. 1 by itself. The advantage only becomes apparent if the image receiver 12 is replaced by another image receiver which operates at a lower resolution than the image receiver of FIG. 1. In this case, the image source does not need to be adapted to the lower resolution. The advantage of using the invention will be made clear using FIG. 4.

FIG. 4 shows a further image transfer system according to the invention. Except for the image receiver 12 this system is the same as that of FIG. 1. Elements equivalent to those of the image transfer system of FIG. 1 have been indicated with the same reference numerals. The main difference with FIG. 4 is that the display device 422 has a resolution that is a factor 2 lower than that of the display device 122 of FIG. 1 in both the X and Y directions. The image source 10 supplies pixel values in the same sequence as in FIG. 1. The image source 10 is independent of the resolution actually used in the image receiver 12.

A difference with the system of FIG. 1 is further that the data from the data output 16 is passed through a summing circuit 40. By way of example this circuit contains an adder 46 with a first adder input coupled to the data output 16 of the image source 10 and an adder output coupled to a register 44. An output of the register 44 is coupled to a second adder input of the adder 46. The register 44 has a load input coupled to the clock output 14 of the image source 10 and a reset input coupled to the output of the second divide-by-two circuit 120b in the cascade of divide-by-two circuits 120a–f.

In operation the summing circuit each time sums the four pixel values of each four pixel block at the level 24. Each time the clock output 14 signals that a pixel value has arrived via the data output 16, the sum of that pixel value and the previous content of the register 44 is latched into the register. After four clock pulses, when pixel values a complete block of four pixels has arrived, the content of the register 44 is reset to zero e.g. in response to a 1-0 edge at the output of the second divide-by-two circuit 120b in the cascade.

A difference with the system of FIG. 1 is furthermore that the outputs of the first and second divide-by-two circuits 120a,b at the input end of the cascade of divide-by two circuits 120a–f are not supplied to the X and Y address ports 124, 126, that the output of the second divide-by-two circuit 120b is used to clock the display device 122 (with a suitable delay to allow the cascade to settle) and that the output of the register 44 is coupled to the data input port 128 of the display device 422.

In operation, an output pixel value and an (X,Y) address is clocked into the display device 422 from the register 44 after reception and summing of four pixel values from a block of 4 pixels from the level 24 (and before reset of the register 44, obviously). Thus a filtered lower resolution image is displayed on the display device 422. It will be noted that for this purpose no memory for complete lines of the image is needed in the image receiver 42.

The same result can be achieved for an image transfer system with a display device of even lower resolution merely by summing more pixel values and using a smaller address. Of course, instead of summing of the pixels in a block, other operations could be applied to these pixels, such as weighted summing or sampling of one of the pixel values to be used as output value. In the latter case, the invention ensures equal time spaces between successive samples, which allows the display device equal time to handle each pixel. The cascade shown for computing the X,Y addresses is shown for illustration of a convenient method of generating addresses only. If a cascade is used, then instead of the asynchronous cascade a synchronous (collectively clocked) divide-by-two cascade may be used, the output of the second divide-by two circuit being used to enable the clock in the case of a reduction of resolution by a factor of 2 in the x and y direction.

It will be apparent that the advantages of the invention can be achieved with any sequence of transferring blocks as a whole, not just with the upper-left, lower-left, upper-right, lower-right sequence shown in FIG. 3 by way of example, nor with does the sequence need to be the same for each level of blocks. Different sequences merely require different (usually more complicated) address generation, for example using a ROM to translate a pixel count into an X-Y address. Nor is the image receiver 12, 42 limited to direct driving of a display device 122, 422. The image receiver might for example write the pixel values into a memory (not shown) storing the image at the resolution appropriate to the image receiver 12, 42.

Moreover, it will be apparent that the size of the blocks used in the figures is merely for the purpose of illustration. A block does not always need to be square (e.g. one might use a lowest level of blocks of 2×3 pixels). Nor does the subdivision into smaller blocks of a next lower level of blocks always need to be in a 2×2 matrix (one might use e.g. a 2×3 matrix).

Moreover, it will be apparent that the size of the image used in the figures is merely for the purpose of illustration. In practice, a size of more than 8×8 pixels will usually be used, e.g. 256×256. Practical sizes include non-square sizes (with different X and Y ranges) and X and Y resolutions that are not a power of 2. For practical sizes the highest relevant level of blocks may be a matrix containing a substantial number of blocks (e.g. 96×64 of each 8×8 pixels). In this case the blocks at the highest relevant level may for example be transferred row by row (for example first 96 blocks from a row at the top of the image, then 96 from the next row). As long as all pixel values are transferred so that the blocks at this highest relevant level nor the blocks from matrices below this highest level are split, it is possible to use different image receivers for a range of resolutions (e.g.96× 64, 192×128, 384×256, 768×512) exchangeably. In this case, the cascade of divide-by-two circuits 120a–f may be followed by a cascade of an X address counter and a Y-address counter for determining the most significant part of the (X,Y) address.

What is claimed is:

1. An image handling apparatus comprising an image source for outputting a sequence of pixel values of an image which is organized into a plurality of levels of blocks of pixels, each particular level, except a top level, providing a subdivision of each block of pixels of a next higher level into a respective matrix of blocks of pixels of that particular level, the image source wherein the pixel values in the sequence are ordered on a block after block basis with respect to each block at each level, such that, independent of content of the image, the pixel values of all pixels of each particular block appear consecutively without intervening appearance of pixel values of pixels from other blocks from the level to which the particular block belongs.

2. The apparatus according to claim 1, further comprising an image receiver which is arranged to receive the pixel values outputted by the image source and to retain the image at a coarser resolution than a resolution of individual pixels, the image receiver retaining only one respective output pixel for each particular block of a predetermined level, the image receiver deriving the one respective output pixel for the particular block from one or more of the transferred pixels of that particular block.

3. The apparatus according to claim 1, wherein the sequence of pixel values is such that the blocks from each matrix appear in a same order according to their spatial position in the matrix.

4. A method of outputting a sequence of pixel values of an image which is organized into a plurality of levels of blocks of pixels, each particular level, except a top level, providing a subdivision of each block of pixels of a next higher level into a respective matrix of blocks of pixels of that particular level, wherein the pixel values in the sequence are ordered on a block after block basis with respect to each block at each level, such that, independent of content of the image, the pixel values of all pixels of each particular block appear consecutively without intervening appearance of pixel values of pixels from other blocks from the level to which the particular block belongs.

5. The method according to claim 4, wherein the sequence of pixel values is such that the blocks from each matrix appear in a same order according to their spatial position in the matrix.

6. A signal for conveying image information as a sequence of values of input pixels, which image information can be used at different resolutions by deriving respective output pixels from different sized blocks of the input pixels, said different resolutions including a highest resolution corresponding to blocks of 1 input pixel each, a lowest resolution corresponding to largest sized blocks of k input pixels each, and at least a one intermediate resolution corresponding to intermediate sized blocks of n input pixels each, each of the largest sized blocks being made up by m=k/n of the intermediate sized blocks, where m is an integer, wherein the sequence of values of the input pixels in the signal are ordered on a largest sized block by largest sized block basis, and on a intermediate sized block by intermediate sized block basis within each largest sized block, and the image is made up of m largest sized blocks which are transmitted in a same order according to their spatial position in the image as are the m intermediate sized blocks making up a largest sized block transmitted according to their spatial position in the largest sized block.

\* \* \* \* \*